Patented Mar. 8, 1932

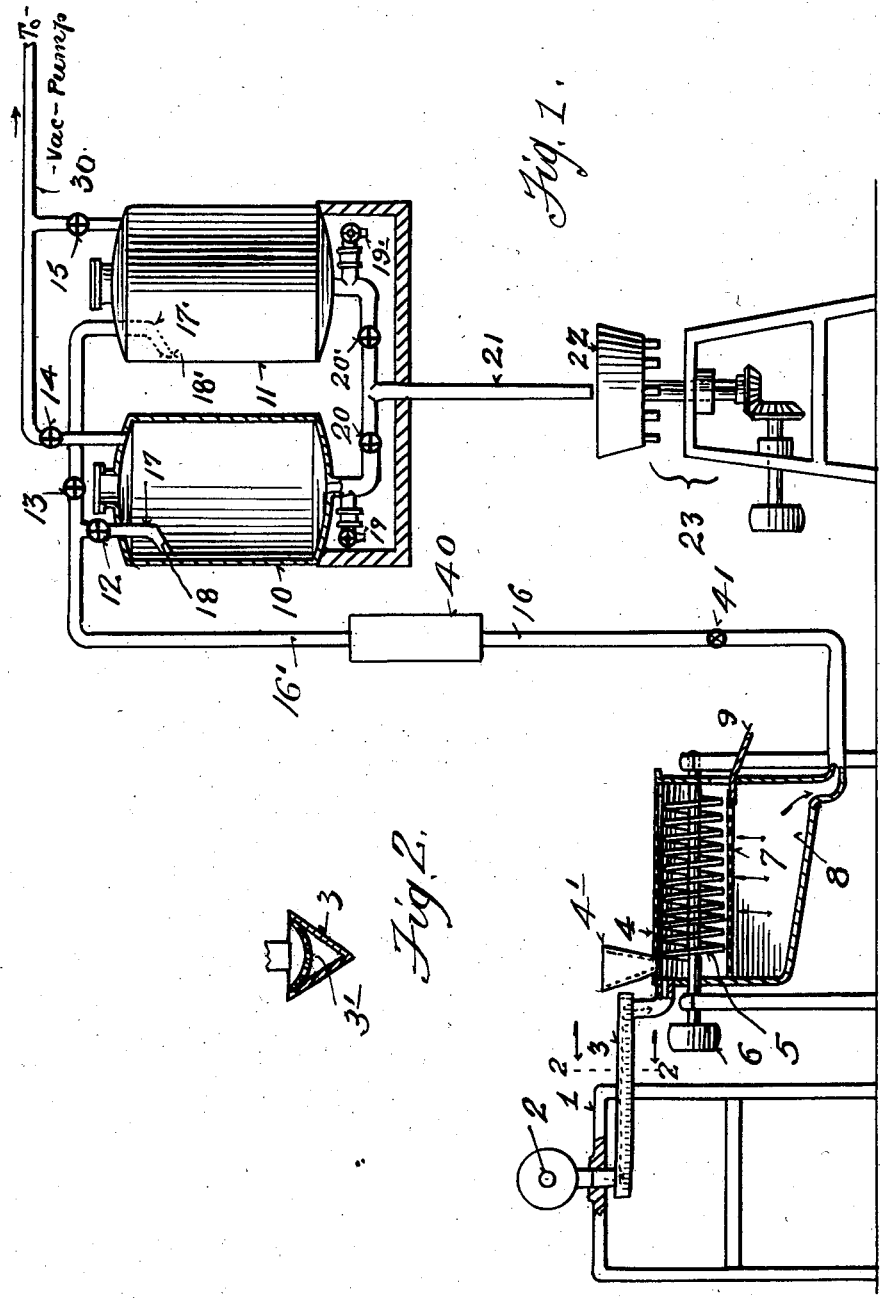

1,848,760

UNITED STATES PATENT OFFICE

WALTER WILLIAM WILLISON, OF BROOKLYN, NEW YORK

METHOD OF MAKING PURE ORANGE JUICE HAVING THE DESIRED DEGREE OF ORANGE FLAVOR AND COLOR

Application filed July 18, 1928. Serial No. 293,562.

This invention relates to a method of making pure orange juice of desired standard as to flavor, color and purity.

The object of this invention is to readily and economically obtain a pure orange juice; that is, I so prepare the juice that the finished product possesses the orange flavor and color to a desired degree without addition of sugar, artificial coloring or flavoring or any substance foreign to the fruit.

Another object includes the method of preparing the fruit emulsion and utilizing the same in standardizing the fruit juice.

The two known methods of obtaining orange juice are (1) by squeezing or passing oranges through fluted bronze rollers; and (2) by spindling or applying oranges cut in half to rotating cones.

Juice obtained by the first named method contains some of the oil and the bitter principle of the inner peel. Consequently, to make the juice palatable a large quantity of sugar must be added, which in some cases is as high as twelve pounds to the gallon. Juice thus sweetened is therefore not a pure orange juice, and it has not the desired orange flavor.

On the other hand, juice obtained by the spindling method while free from orange peel, oil and its bitter principle, is lacking in orange flavor and when pasteurized develops a distinctive cooked flavor, which is very undesirable.

My invention overcomes the above noted disadvantages and provides for the production of a pleasing healthful, natural-flavored, pure fruit juice of standardized food value, flavor and color.

By "pure" fruit juice is meant that the juice prepared in accordance with my invention is unadulterated or mixed with any ingredients not found in the fruit, and orange juice so prepared will possess and retain its natural flavor and color and will not readily develop a cooked taste in even excessive pasteurization.

As a preferred mode of procedure in making standardized pure orange juice I cut or peel off by suitable means the yellow or outer peel only. This peel or shaving is then chopped into small pieces by running it through a food chopper. The chopped peel is then washed with cold water to remove any bitter principle that may have adhered to the peel if shaved or cut too deeply or too closely to the inner peel or white pulp which contains the bitter principle. The oranges may be shaved or peeled whole and before the juice is removed, or the peeling may be done after the oranges are cut into half and juice has been removed.

The oranges either before or after shaving are cut in half and reamed on a suitable burrhead or other means to remove the juice. The reaming also removes the seeds and some of the inner partition membrane, which contains the bitter principle. Both the seeds and pieces of membranes are removed in any desired manner as by screening. This step should be performed quickly and with the least possible exposure of the juice to the air so as to keep the juice from oxidizing and in the natural state as nearly as possible.

The juice thus exposed and separated from seeds and particles of membranes is next agitated intensely with a proper amount of chopped and washed peel shavings to supply the desired flavor and color. The amount of prepared peel flavoring and coloring used depends upon the condition and quality of the fruit. For ripe oranges, of good color the proportion of washed and prepared peel flavoring and coloring is about five ounces to the gallon of juice. Agitating or beating of the juice and chopped peel may be done in any desired manner and pieces of peel should be removed before the juice is vacuumized and canned.

A modified mode of standardizing the orange juice is by obtaining an emulsion or flavoring and coloring extract from the orange skin in the manner described below and then adding the necessary amount of the emulsion to the vacuumized fruit juice. If the emulsion is used, I omit adding chopped and washed peel to the juice. The juice, however, is prepared as before to the point of releasing the vacuum for canning, at which stage the proper amount of standardizing emulsion is added. For this purpose I prepare peel emulsion which is freed from its bitter principle in the manner now to be described. At the appropriate stage in the preparation of the juice I add the desired amount of the peel emulsion to standardize the juice to its required flavor, color and food value.

The identity of the bitter principle in the orange peel is not well known, but it is believed to contain glucosides, ischesperin and aurantiamarin. In preparing the peel emulsion I grate the orange to obtain the outer peel or I finely chop the orange peel from which the juice has been spindled. The grated or chopped peel is then mixed with water and ground up to completely rupture the oil cells. The mass is then pressed by suitable means to remove most of the oil. Considerable pigment and some of the bitter ingredients in the form of an emulsion will be contained in this product. Water may be added a second time to the press cake and the above operation repeated.

The liquid pressed from the gratings and/or chopped peel will separate at once into two layers of which the upper layer, is the emulsion and the lower is principally water mixed with some of the bitter principle. The lower layer is drawn off and clean warm water is mixed or shaken with the emulsion which is then again allowed to stratify. The lower layer is again drawn off as before to thereby wash the bitter principle out of the emulsion. This washing may be repeated two, three or more times as may be required. Washing removes the bitter principle but not the oil or the pigment. I find that washing is more effective if a little sodium chloride or magnesium chloride is added to the wash-water. The emulsion thus prepared may be kept in stoppered glass bottles and used for standardizing that is for flavoring and coloring fruit juices to the desired quality. The amount of emulsion required depends upon the character of the fruit juice to be standardized. I find one part of the emulsion to about two hundred parts by volume of the juice, to be sufficient for good ripe oranges. When however, the juice is pale in color and weak in flavor, a little more emulsion may be added. The emulsion is believed to be a colloidal solution and is suited also as a flavoring extract for candies, cakes and for other purposes.

This invention may be carried out by suitable means and in the accompany drawings I have shown, somewhat diagrammatically, apparatus suitable for carrying out the invention. Figure 1 shows apparatus suited to carry out my invention and Figure 2 is a view on the line 2—2 of Figure 1.

On the table 1 is provided a suitable spindle or reamer 2, opening into a trough 3, for conveying the juice to the separator 4. A screen 3′ or trough 3 provides means for separating the juice from the seed and pieces of the membranes from the inside of the orange. The separator is provided with a hopper 4′ for feeding the required amount of chopped orange peel. A spiral agitator 5 is driven from a pulley 6 at a high speed, so as to break up and mix the flavoring and coloring chopped peel with the fruit juice which is then strained through a suitable strainer 7 into hopper 8. The peel particles are finally discharged at 9.

From hopper 8 the juice is drawn by vacuum, into one of the two storage tanks 10 or 11, depending on which of the valves 12 or 13 and 14 or 15 are open. If valves 12 and 14 are open, the liquid will flow through pipes 16 and 17, through the restricted nozzle 18 and dash against the wall of tank 10 in a fine sheet of liquid to thus remove from the juice, all or practically all the occluded airs and gases. To facilitate vacuumization I provide a heater 40 on pipe 16 whereby the juice is heated to about 90° F. It is then quickly cooled as it passes through pipe 16′ to the tank 10 or 11. A valve 41 in pipe 16 provides means for controlling the flow of the juice.

After the required amount of juice has been supplied to tank 10, valves 12 and 14 are closed and valves 13 and 15 are opened. The fruit juice will then be drawn into tank 11 from hopper 8 through pipes 16 and 17 and the fine flat nozzle 18′. In the mean time vacuum is broken on the first tank, the juice may now be again tested as to color and flavored and canned under vacuum.

When the emulsion method is used for standardizing the juice, the seed is permitted to enter the separator 4. This may be done by removing screen 3′ to allow the seeds and pulp to enter with the juice, or the seed may be fed into the agitator 4 through the hopper 4′.

Here it is beaten by the spiral agitator 5 so as to break the seed cells and partially emulsify the liquid content. The solid matter is discharged at 9. This step of agitation appears to have a beneficial effect on the juice in that it becomes heavier and holds in suspension the fine cell particles.

The juice is now drawn into from hopper 8 into tanks 10 or 11 as in the preferred mode of procedure and the required amount of peel emulsion is now added. The tank is then again put under vacuum by opening the vacuum valve (14 for tank 10 or valve 15 for tank 11). A small air valve 19 (or 19′) at the bottom of the tank is now opened to allow a fine stream of air bubbles to enter and mix the juice and peel emulsion in the tank.

Agitation thus obtained is rapid and very efficient. It furthermore requires no mechanical means within the tank to effect thorough mixing. It is understood that pipe 30 connects tanks 10 and 11 with a vacuum pump (not shown).

After a few minutes of agitation, vacuum on the tank is again broken by known means (not shown) and the standardized and emulsified fruit juice is allowed to flow by gravity through valve 20 (or 20') through pipe 21 into the pan 22 of the can filler 23 of known construction, where the cans are filled, capped and sealed by known means (not herein shown or claimed).

The sealed containers are then sterilized in preferably a water bath at 165° to 170° F. and subsequently quickly cooled.

It will be noted that my mode of making pure fruit juice produces a product of great uniformity in a rapid and efficient manner, without exposing the juice to the open atmosphere for any length of time, nor is the juice heated in the open and it is sterilized after it has been sealed in the container in which it is stored and sold.

Having thus described my invention what I claim as new and useful and desire to secure by United States Letters Patent is:

1. The method of making a standardized pure fruit juice, which comprises separating juice from the seeds and pulpy matter, then violently agitating said juice with chopped orange peel shavings therein and thereafter separating said shavings from the juice and then vacuumizing said juice.

2. The method of making a standardized pure or substantially pure fruit juice which comprises separating the juice, seeds and pulpy matter from the peel and agitating said separated juice with the seeds and pulpy matter therein to thereby emulsify said juice and standardize its flavor, then free the juice from said seeds and pulpy matter, then adding to said fruit juice the required amount of its peel emulsion which has been freed from its bitter principle.

In testimony whereof I have hereunto set my hand on this 16th day of July A. D., 1928.

WALTER WILLIAM WILLISON.